US008923583B2

(12) United States Patent
Thibault et al.

(10) Patent No.: US 8,923,583 B2
(45) Date of Patent: Dec. 30, 2014

(54) METHODS AND SYSTEMS FOR PERFORMING MODEL-BASED ITERATIVE RECONSTRUCTION

(75) Inventors: Jean-Baptiste Thibault, Waukesha, WI (US); Charles A. Bouman, Jr., Lafayette, IN (US); Ruoqiao Zhang, Lafayette, IN (US); Jiang Hsieh, Brookfield, WI (US); Ken David Sauer, South Bend, IN (US)

(73) Assignee: General Electric Company, Schenectady, NY (US)

( * ) Notice: Subject to any disclaimer, the term of this patent is extended or adjusted under 35 U.S.C. 154(b) by 134 days.

(21) Appl. No.: 13/530,846

(22) Filed: Jun. 22, 2012

(65) Prior Publication Data

US 2013/0343624 A1 Dec. 26, 2013

(51) Int. Cl.
*G06K 9/00* (2006.01)

(52) U.S. Cl.
USPC .......................................................... 382/128

(58) Field of Classification Search
None
See application file for complete search history.

(56) References Cited

U.S. PATENT DOCUMENTS

| | | | |
|---|---|---|---|
| 6,675,106 B1 * | 1/2004 | Keenan et al. .................. | 702/28 |
| 6,754,298 B2 * | 6/2004 | Fessler ............................. | 378/4 |
| 6,987,833 B2 | 1/2006 | Du | |
| 7,236,559 B2 | 6/2007 | Jha | |
| 7,397,886 B2 | 7/2008 | Avinash | |
| 7,548,604 B2 * | 6/2009 | De Man et al. ................. | 378/17 |
| 7,551,708 B2 * | 6/2009 | Basu et al. ........................ | 378/5 |
| 7,697,657 B2 * | 4/2010 | Walter et al. ..................... | 378/4 |
| 7,760,848 B2 | 7/2010 | DeMann | |
| 7,839,971 B2 * | 11/2010 | Bendahan et al. .............. | 378/57 |
| 8,588,494 B2 * | 11/2013 | De Man et al. ............... | 382/131 |
| 2008/0063135 A1 * | 3/2008 | DeMan et al. .................. | 378/4 |
| 2008/0187091 A1 * | 8/2008 | Basu et al. ........................ | 378/5 |
| 2009/0175523 A1 * | 7/2009 | Chen et al. .................... | 382/130 |
| 2011/0089327 A1 * | 4/2011 | Vija et al. ................. | 250/363.04 |
| 2011/0158498 A1 * | 6/2011 | Li et al. ......................... | 382/132 |
| 2012/0051619 A1 * | 3/2012 | Dennerlein et al. .......... | 382/132 |

OTHER PUBLICATIONS

La Riviere et al ("Penalized-likelihood sinogram decomposition for dual-energy computed tomography", Nuclear science symposiu, IEEE, 2008.*

* cited by examiner

*Primary Examiner* — Shervin Nakhjavan
(74) *Attorney, Agent, or Firm* — Dean D. Small; The Small Patent Law Group

(57) ABSTRACT

A method for reconstructing image component densities of an object includes acquiring multi-spectral x-ray tomographic data, performing a material decomposition of the multi-spectral x-ray tomographic data to generate a plurality of material sinograms, and reconstructing a plurality of material component density images by iteratively optimizing a functional that includes a joint likelihood term of at least two of the material decomposed sinograms. An x-ray tomography imaging system and a non-transitory computer readable medium are also described herein.

21 Claims, 4 Drawing Sheets

METHODS AND SYSTEMS FOR PERFORMING MODEL-BASED ITERATIVE RECONSTRUCTION

BACKGROUND OF THE INVENTION

The subject matter disclosed herein relates generally to imaging systems and more particularly, to methods and systems for performing model-based iterative reconstruction for a dual-energy computed tomography (CT) imaging system.

CT imaging systems may be configured to perform dual energy scanning. Dual energy scanning may be used to obtain diagnostic CT images that enhance contrast separation within the image by utilizing two scans at different chromatic energy states. A number of techniques are known to achieve dual energy scanning, including acquiring two back-to-back scans sequentially in time where the scans require two rotations around the object in which the tube operates at, for instance, 80 kilovolt peak (kVp) and 140 kVp potentials. For example, the x-ray source may be operated at a first kVp setting to acquire a first set of data and then operated, at a second kVp to acquire a second set of data. Optionally, the x-ray source may be operated to continuously switch from the first kVp setting to the second kVp during the acquisition such that the resultant data acquired at the first kVp setting is interleaved with the data acquired at the second kVp setting.

Acquiring X-ray CT exposures at several distinct energy levels enables an operator to distinguish different types of basis material which is useful for disease diagnosis and security inspection. At least one known dual-energy CT reconstruction technique is utilized to reconstruct two density maps for the two basis materials. A cross-sectional attenuation map, emulating the image that would be obtained from a monochromatic acquisition at any given energy, may then be computed as a linear combination of the two material density maps. One known method to perform dual-energy reconstruction initially transforms the low- and high-energy photon counts into quantities that are proportional to the integral of the material density for two basis materials. A material-decomposed sinogram is then filtered backprojected (FBP) to reconstruct the material density maps in image space. The transformation from photon counts to integral projections in the material basis pairs is typically performed using a material-decomposition function which may be experimentally measured through a scanner calibration procedure. However, the processes of applying the material-decomposition function changes the statistics of the measured data, which results for FBP in reconstructions that have statistically correlated noise properties.

Statistical iterative reconstruction approaches such as model-based iterative reconstruction (MBIR) have been shown to have advantages in the reconstruction of conventional (single-spectrum) CT data. More specifically, using models of the scanner geometry, data noise, and the statistics of the projection data for the image to be reconstructed, facilitates both reducing noise and improving resolution in the reconstruction. Statistical algorithms that explore the interactions between measurement statistics and dual-energy reconstruction have been proposed. For example, one algorithm utilizes a penalized likelihood approach for a polyenergetic model based on Poisson statistics to correct for beam-hardening artifacts. However, the reconstruction is still performed from single-energy data. Another algorithm utilizes a penalized weighted least-squares (PWLS) method with image-domain regularization under a monochromatic assumption for source spectra.

More generally, a concern of dual or multi-energy CT is how to reconstruct an image of material densities, x, from dual or multi-energetic sinogram measurements, y. For example, for a dual energy system with two spectral measurements, the dual-energy sinogram is given by $y_{i,k}$ where $i=1, \ldots M$ indexes the projections and $k=1, 2$ indexes the two energies. In this case, each voxel of the reconstruction represents the densities of two basis materials, $x_{j,k}$, where $j=1, \ldots N$ indexes the voxel and k indexes one of the two basis materials. The basis materials may be, for example, water and iodine.

One known method of iteratively reconstructing dual energy CT data performs direct reconstruction of x from the multi-spectral measurements y. In this method, the reconstruction is produced through minimization of a cost function having the general form:

$$\hat{x} = \arg\min \{D(y; x) + S(x)\} \quad \text{Equation 1}$$

where $D(y; x)$ is a function which models the likelihood of observing the multi-energy measurements of y given the hypothesized reconstruction of x, and $S(x)$ is a stabilizing function which regularizes the problem by assigning a larger cost to density images, x, that are unlikely to be correct. The disadvantage of this method is that the function $D(y; x)$ is generally very complex and computationally difficult to model due to the nonlinear relationship between x and y.

Optionally, y may be transformed into a material-decomposed sinogram using a nonlinear transformation operator $h^{-1}$. Using the nonlinear transformation operator $h^{-1}$, the material decomposed sinogram may be expressed as: $[\hat{p}\_\{i,1\}, \hat{p}\_\{i,2\}] = h^{-1}(y\_\{i,1\}, y\_\{i,2\})$, where for $\hat{p}\{_{i,k}\}$, $i=1, \ldots M$ indexes the projections and k indexes one of the two basis materials. The material-decomposed sinogram is linearly related to x through the projection integrals. More specifically, the resulting decomposed sinogram corresponds to a set of material projections for each corresponding material component of x. Accordingly, when the noise is relatively small: $\hat{p} = Ax$. This is an advantage over direct reconstruction via Equation 1 since the standard framework for MBIR that assumes the linearity of the relationship between p and x can be applied without dealing with the complexity of $D(y; x)$ explicitly.

In practice, the form of the material decomposition operator, $h^{-1}$, may be estimated from system calibrations and the known physical behavior of various materials. For example, in one known method, the material decomposition sinogram is used to simplify the formulation of the iterative reconstruction problem. In this method the problem is formulated as:

$$\hat{x} = \underset{x}{\operatorname{argmin}}\left\{\sum_{k=1}^{K} D_k(\hat{p}_{*k}; x_{*k}) + (S(x))\right\}, \quad \text{Equation}$$

where K=2 and $\hat{p}_{*k}$ denotes the estimated material decomposition sinogram for all i indexes for the k=1 and k=2 basis materials, and $x_{*k}$ denotes the material density reconstruction for all j indexes for the k=1 and k=2 basis materials. This method is computationally more direct than the method using minimization of a cost function described by Equation 1, but the decoupled terms of Equation 2 do not fully account for the dependencies between sinogram entries that are caused by the application of the material decomposition operator.

In another known method, the material decomposed sinograms are directly estimated using an iterative sinogram restoration technique. The sinogram restoration formulation then uses a Penalized Weighted Least-Square (PWLS) framework to estimate the material decomposed projections, wherein the weights are computed to approximate the inverse covariance of the decomposed sinograms. However, image reconstruction is still performed with FBP. Another proposed method of reconstruction provides a two-step PWLS approach, wherein a first PWLS estimates the material sinograms from the dual-energy data and a second PWLS reconstructs iteratively the images from the estimated sinogram using a diagonal weighting matrix that does not take into account the statistical correlation between the material sinograms. New joint regularization in the material component densities was also introduced to preserve edges at the same spatial locations. Additionally, the dual-energy problem may be formulated as a double minimization 1-divergence problem. However, the double minimization 1-divergence approach does not specifically account for the correlation of material sinograms in the cost function.

Accordingly, known methods directed to model-based dual-energy reconstruction do not fully model the statistical dependencies in the material-decomposed data. More specifically, the known methods treat the two (or more) material-decomposed sinograms as statistically independent, or equivalently, these methods minimize a cost function with a separate term for each component of the material-decomposed sinograms.

BRIEF DESCRIPTION OF THE INVENTION

In one embodiment, a method for reconstructing image component densities of an object is provided. The method includes acquiring multi-spectral x-ray tomographic data, performing a material decomposition of the multi-spectral x-ray tomographic data to generate a plurality of material sinograms, and reconstructing a plurality of material component density images by iteratively optimizing a functional that includes a joint likelihood term of at least two of the material decomposed sinograms.

In another embodiment, an x-ray tomography imaging system including a processor is provided. The processor is programmed to acquire multi-spectral x-ray tomographic data, perform a material decomposition of the multi-spectral x-ray tomographic data to generate a plurality of material sinograms, and reconstruct a plurality of material component density images by iteratively optimizing a functional that includes a joint likelihood term of at least two of the material decomposed sinograms.

In a further embodiment, a non-transitory computer readable medium is provided. The non-transitory computer readable medium is programmed to instruct a processor to acquire multi-spectral x-ray tomographic data, perform a material decomposition of the multi-spectral x-ray tomographic data to generate a plurality of material sinograms, and reconstruct a plurality of material component density images by iteratively optimizing a functional that includes a joint likelihood term of at least two of the material decomposed sinograms.

DETAILED DESCRIPTION OF THE INVENTION

Figure 1:
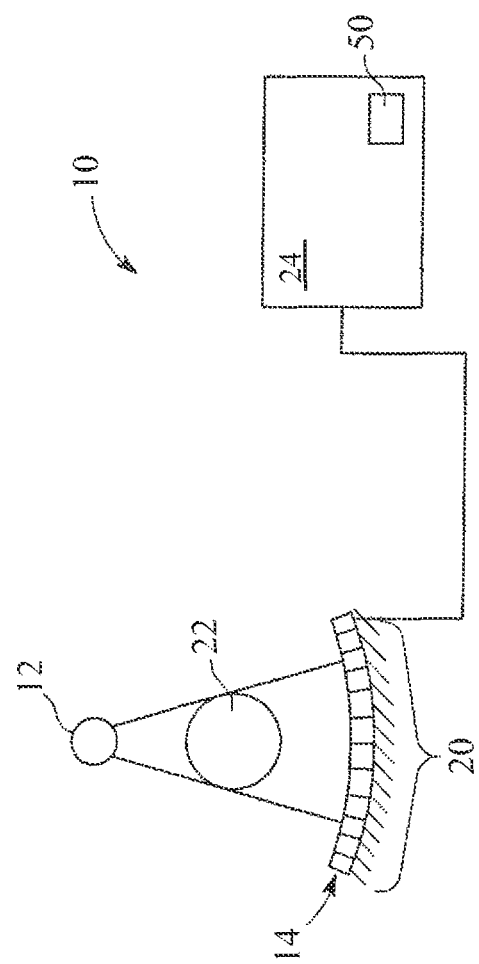
FIG. 1 is a simplified block diagram of an imaging system formed in accordance with various embodiments.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the term "reconstructing" or "rendering" an image or data set is not intended to exclude embodiments in which data representing an image is generated, but a viewable image is not. Therefore, as used herein the term "image" broadly refers to both viewable images and data representing a viewable image. However, many embodiments generate, or are configured to generate, at least one viewable image.

Various embodiments provide systems and methods for reconstructing image component densities of an object, or subject, using multi-spectral x-ray tomographic data. More specifically, the various embodiments enable image reconstruction of dual-energy data using a model-based iterative reconstruction (MBIR) technique. Technical effects of one or more embodiments include fully accounting for the statistical dependencies in the material-decomposed sinograms, allowing for accurate modeling of the sinogram when fast kVp switching is used, accurately modeling the energy-dependent attenuation positivity constraint in the material domain, incorporating accurate modeling of the prior distribution using material basis-functions, and enabling the parameters of the material decomposition process to be updated or revised based on the reconstructed image densities, thus alternating between material decomposition and image reconstruction.

FIG. 1 illustrates a simplified block diagram of an exemplary imaging system 10 that is formed in accordance with various embodiments. In the exemplary embodiment, the imaging system 10 is an x-ray tomography imaging system that includes an x-ray source 12 and a detector 14. The detector 14 includes a plurality of detector elements 20 that are arranged in rows and channels, that together sense projected x-rays, from the x-ray source 12 that pass through an object, such as a subject 22. Each detector element 20 produces an electrical signal, or output, that represents the intensity of an impinging x-ray beam and hence allows estimation of the attenuation of the beam as the beam passes through the subject 22. The imaging system 10 also includes a computer 24 that receives the projection data from the detector 14, also referred to herein as raw data, and processes the projection data to reconstruct an image of the object 22. In general, the raw data is x-ray counts that represent a quantity of photons detected by the detector 14 which may then be integrated over time to form a measurement or projection data.

More specifically, the x-ray source 12 generates x-rays that follow a distribution, referred to herein as an x-ray spectrum, which is a range of energy between 0 and a maximum energy that the x-ray source 12 delivers, referred to herein as kilovolt peak (kVp). In various embodiments, single energy spectrum is acquired when the x-ray source 12 is operated at a single maximum energy or kVp. Accordingly, during reconstruction, for example with MBIR, data that is acquired at different energies is reconstructed into an image.

In various embodiments, the x-ray source 12 is operated in two modes, using two different max kVp settings during the acquisition. For example, the x-ray source 12 may be operated at a first kVp setting to acquire a first set of data and then operated at a second kVp to acquire a second set of data. Optionally, the x-ray source 12 may be operated to continuously switched from the first kVp setting to the second kVp during the acquisition such that the resultant data acquired at the first kVp setting is interleaved with the data acquired at the second kVp setting. For example, the first kVp setting may be 80 kVp and the second kVp setting may be 140 kVp. Optionally, the first kVp setting may range from 60 kVp to 100 kVp and the second kVp setting may range from energy levels of 120 kVp and above. In various other embodiments, the imaging system 10 may include a second x-ray source (not shown) that acquires data at the second kVp while the x-ray source 12 acquires data at the first kVp setting. Accordingly, in a dual energy scan, two x-ray spectrums are produced at different kVp levels. The result is two CT data sets, allowing differentiating, characterizing, isolating, and/or distinguishing the imaged material. The multi-spectral data may also be acquired using a photon counting mode. For example, the detector 14 may operate in a photon counting mode wherein x-ray photon energy emitted by the x-ray source 12 and passing through the object 22 is converted into current pulse signals, which are detected by the detector 14. The signals received by the detector 14 may be utilized to generate accurate count data that in various embodiments is sufficient for artifact-free or artifact-reduced image reconstruction of the object 22. Moreover, the detector 14 may be specifically utilized to detect x-ray photons at different energies, for instance using a dual-layer structure, where the first layer measures photons of relatively low energy, and the second layer measures photons of relatively high energy that have passed through the first layer without being detected. The measurements may then be utilized to perform accurate energy discrimination of each detected photon.

In various embodiments, the imaging system 10 also includes a module 50 that is configured to implement various methods described herein. For example, the module 50 may be programmed to reconstruct image component densities of an object, or subject, using multi-spectral x-ray tomographic data 60 (shown in FIG. 1) that is acquired from the imaging system 10. The module 50 may be implemented as a piece of hardware that is installed in the computer 24. Optionally, the module 50 may be implemented as a set of instructions that are installed on the computer 24. The set of instructions may be stand alone programs, may be incorporated as subroutines in an operating system installed on the computer 24, may be functions in an installed software package on the computer 24, and the like. It should be understood that the various embodiments are not limited to the arrangements and instrumentality shown in the drawings. In operation, the module may be programmed to acquire multi-spectral x-ray tomographic data, perform a material decomposition of the multi-spectral x-ray tomographic data to generate a plurality of material sinograms, and reconstructing a plurality of material component density images by iteratively optimizing a functional that includes a joint likelihood term of at least two of the material decomposed sinograms. As used herein a functional is a real-valued function on a vector space V of functions.

Figure 2:
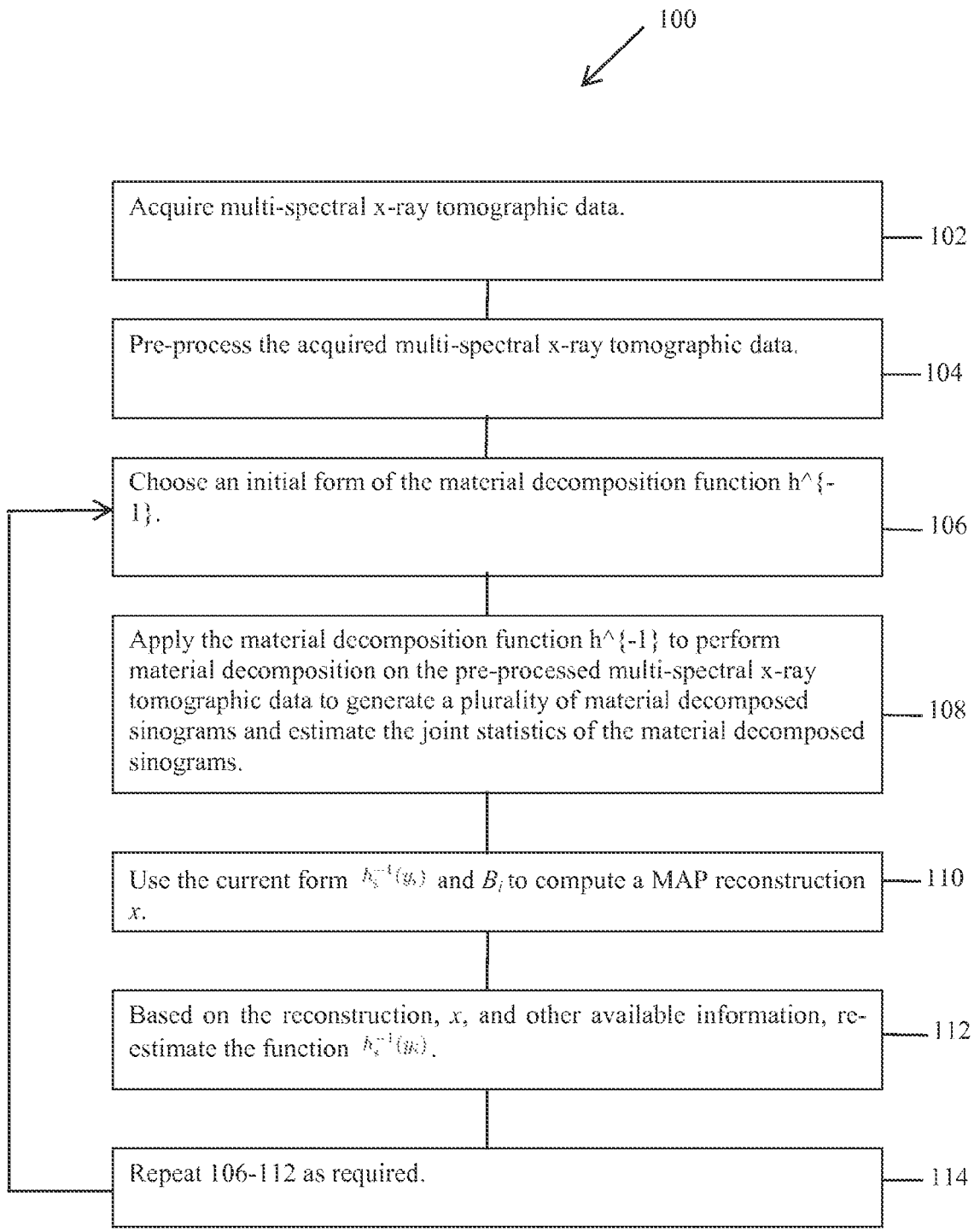
FIG. 2 is a flowchart of a method for reconstructing an image of an object in accordance with various embodiments.

FIG. 2 is a flowchart of a method 100 for reconstructing an image of an object in accordance with various embodiments. The method 100 may be embodied as an algorithm that is operable to perform the methods described herein. The algorithm may be embodied as a set of instructions that are stored on a computer and implemented using, for example, the module 50, shown in FIG. 1.

Referring to FIG. 2, at 102 multi-spectral x-ray tomographic data 60 is acquired. In various embodiments, the multi-spectral x-ray tomographic data 60 may be a two-dimensional (2D) volume of data, e.g. a single CT slice, a three-dimensional (3D) volume of data, a four-dimensional (4D) volume of data that include motion, etc. The multi-spectral x-ray tomographic data 60 may be acquired by operating the imaging system 10 in a fast-switching model such that a first set of data acquired at a first kVp setting is interleaved with a second set of data acquired at a second kVp setting. Optionally, the imaging system 10 may be operated such that the first set of data is acquired at the first kVp setting and subsequently the second set of data is acquired at the second kVp setting. Optionally the first set of data at the first kVp setting and the second set of data at the second kVp setting are acquired simultaneously using a system with two separate x-ray tubes. Accordingly, the multi-spectral x-ray tomographic data 60 includes data acquired at two different kVp settings.

At 104, the multi-spectral x-ray tomographic data 60 is pre-processed. Pre-processing may include, for example, applying calibration corrections and other data transformation, such as de-noising the multi-spectral x-ray tomographic data. In various embodiments, de-nosing is accomplished in projection space to correct for artifacts and noise that may be introduced by, for example, low flux measurements. The multi-spectral x-ray tomographic data 60 may be de-noised using, for example, an adaptive filtering technique. One such adaptive filtering technique utilizes a "smoothing" operation. "Smoothing" operations generally involve adjusting the signal detected at one channel based on the detected signal magnitude at the channel and the magnitudes of the detected signals of adjacent channels. It should be realized the other filtering techniques may be utilized to de-noise the projection data at 202 and that the filter techniques described herein are exemplary only.

In other embodiments, pre-processing may include performing a negative log operation on the multi-spectral x-ray tomographic data 60. In general, the negative log operation is used to determine attenuation measurements from photon counts (e.g., x-ray photon counts detected by the detector 14) after normalization by the input flux. Other pre-processing may include a calibration gain correction and other calibrated corrections.

A material decomposition is performed on the pre-processed multi-spectral x-ray tomographic data 60 to generate a plurality of material sinograms. More specifically, at 106, an initial form of the material decomposition function $h^{-1}$ is chosen. At 108, the material decomposition function $h^{-1}$ is applied onto the multi-energy data to generate material decomposed sinograms; at the same time, the joint statistics in the material decomposed sinograms are also estimated. An iterative reconstruction is performed using the plurality of sinograms. More specifically, described herein is a method and system to reconstruct a material decomposed density image, x, via a method that accurately accounts for the statistical dependencies in the poly-energetic sinogram measurements:

Initially, a material decomposed sinogram, $\hat{p}$, may be generated from detector measurements, y (the data 60). In accordance with:

$$[\hat{p}_{i,1}, \hat{p}_{i,2}] = h_i^{-1}(y_{i,1}, y_{i,2}) \; \forall i = 1, \ldots M \qquad \text{Equation 3}$$

Subsequently, the image component densities as MAP estimates may be calculated from the joint likelihood of the material decomposed sinograms in accordance with:

$$\hat{x} = \underset{x \in \Omega}{\operatorname{argmin}} \{D(\hat{p}_{*,1}, \hat{p}_{*,2}; x_{*,1}, x_{*,2}) + S(x)\}. \qquad \text{Equation 4}$$

where $D(\hat{p}_{*,1}, \hat{p}_{*,2}; x_{*,1}, x_{*,2}) = D(\hat{p}; x)$ models the joint likelihood of the material decomposed sinogram $\hat{p}$, given the material component density reconstruction, x, and $S(x)$ models the joint distribution of x into material basis function vectors representing non-negative energy absorption constrained by $\Omega$. In various embodiments the method of Equations 3 and 4 may be described herein as Model Based Iterative Reconstruction (MBIR), or MBIR for dual-energy data. Accordingly, the joint likelihood term includes a plurality of weighting matrices $B_i$, at least two of the weighting matrices $B_i$ varying in a temporal direction which provides the advantage that views at low kvp and high kvp are very well correlated temporally in that it is almost the same ray that goes through the patient at the same angle.

The methods described herein model the joint distribution of the two components of y, and in particular, the interdependence between components of y corresponding to different material components (e.g. water and iodine, for example) that result from the application of the material decomposition function in Equation 3. The method models the correlation of noise among the material projections after the sinogram decomposition step. The methods in various embodiments therefore improve computational efficiency by working from the material decomposed sinogram data while retaining the accuracy of using proper spectral decomposition models for y.

Moreover, the form of the cost function of Equation 4 allows for the proper modeling of the joint distribution of the two components of the material decomposed sinogram. In particular, a quadratic approximation of the joint log likelihood function works well. This approximation may have the form:

$$D(\hat{p}_{*,1}, \hat{p}_{*,2}; x_{*,1}, x_{*,2}) \approx \frac{1}{2} \sum_{i}^{M} (\hat{p}_l - A_l, x) B_l (\hat{p}_l - A_l x)^t \qquad \text{Equation 5}$$

where $\hat{p}_i = [\hat{p}_{i,1}, \hat{p}_{i,2}]$ and the weighting matrix $B_i$ is given by:

$$B_i = [\nabla h_i^{-1}(y_i)]^{-1} W_i [\nabla h_i^{-1}(y_i)]^{-1} \qquad \text{Equation 6}$$

and $W_i = \operatorname{diag}\{w_{i,1}, w_{i,2}\}$ is defined as the inverse covariance of the sinogram measurement $y_i = [y_{i,1}, y_{i,2}]$. In the illustrated embodiment, $W_i$ is diagonal due to the assumption that incident rays from different spectra are mutually independent. Moreover, each matrix $B_i$ is a 2×2 symmetric matrix which represents the inverse covariance of the material-decomposed sinograms $\hat{p}_i$. The off-diagonal entries of $B_i$ therefore provide information about the correlation between the sinograms of distinct materials.

As described above, the material decomposition function $h_i^{-1}(y_i)$ or the noise covariance matrix, $B_i$ may not be accurately modeled based on the initial values of the sinogram photon counts. For example, noise or inaccuracy in the detector measurements may result in an inaccurate model. Moreover, material or detector non-linearities, dependence of system behavior on material composition, uncertainty in the spectral distribution, calibration errors, or instabilities due to motion or other temporal variations may also result in an inaccurate model.

Accordingly, the iterative methods described herein may be utilized to more accurately determine the function, $h_i^{-1}(y_i)$, and the weighting matrix, $B_i$, as part of the reconstruction process. This results in a closed-loop MBIR reconstruction algorithm, as shown in FIG. 2, with the following form:

At 108: Initialize the form of $h_i^{-1}(y_i)$ and $B_i$.

At 110: Use the current form $h_i^{-1}(y_i)$ and $B_i$ to compute the MAP reconstruction x.

At 112: Based on the reconstruction, x, and other available information, re-estimate the functions $h_i^{-1}(y_i)$ and $B_i$.

At 114: Repeat, starting at Step 106 as required using the re-estimated function $h_i^{-1}(y_i)$ generated at 112.

Accordingly, the initial material decomposition and the estimation of the B image are performed at the same time. A partial reconstruction is then performed using the initial material decomposition. However, in the exemplary embodiment described herein an initial estimate of the image to be reconstructed is generated and then used to improve the material decomposition. More specifically, at 114, the method returns to step 106 wherein a revised material decomposition is performed to estimate a new material decomposition and a revised B matrix is generated.

In various embodiments, the steps 106-114 may be iterated based on an input received by a user. For example, the user may view the image x reconstructed after a single iteration. Based on the operator review, the operator may instruct the computer 24 and/or the module 50 to perform a subsequent iteration. In various other embodiments, the computer 24 and/or the module 50 may be programmed to perform a predetermined number of iterations. For example, the operator may instruct the computer 24 to perform a plurality of iterations, for example, five iterations, or more or less. In various other embodiments, the computer 24 may be programmed to perform continual iterations until the differences between successive estimates of the $h_i^{-1}(y_i)$ and the matrix B, are above or below a predetermined threshold. For example, steps 106-114 may be iteratively repeated until the results converge or the image and/or the material decomposed sinograms do not change substantially.

In various embodiments, the methods described herein may be utilized to reconstruct an image using data acquired during a fast kVp-switching acquisition. More specifically, as described above, dual-energy data may be acquired via different modes, including rotate-rotate, dual-tube, dual-layer detector, or fast kVp-switching mode. In the fast kVp-switching mode, multi-spectral data is acquired by changing the effective kVp (i.e. the x-ray tube spectrum) from view to view, providing high spatial and temporal registration of low and high kVp measurements in various embodiments. However, it should be realized that each projection in fast kVp switching mode includes only either the low kVp or the high-kVp measurement, whereas ideal projection material decomposition uses both. Conventional techniques rely on explicit interpolation of the missing measurement from view to view, which may introduce errors because of the interpolation process, or directly reconstruct from y, which can make the reconstruction very complex.

In various embodiments described herein, a material decomposition is initially performed in the sinogram domain via $h^1(\ )$. The estimate of the covariance in the decomposed projection sinogram is then calculated before the statistical iterative reconstruction of the material component densities. For fast kVp-switching acquisitions, this results in a calculated confidence weighting that corresponds to infinite variance in the projections for the missing samples. More specifically, the interpolated values for the missing samples have essentially no contribution to the reconstructed results.

Accordingly, for a fast kVp-switching acquisition, if a low kVp measurement is made, then $w_{i,2}=0$, and if a high kVp measurement is made, then $w_{i,1}=0$, where the k=1 and k=2 subscripts correspond to the low- and high-kVp spectra, respectively. The missing components for the values of $y_i$ are then computed by interpolation. However, these interpolated values are only used to compute the gradient $\nabla h_i^{-1}(y_i)$. Consequently, the gradient has only a small effect on the value of matrix $B_i$. Moreover, the matrix $B_i$ is always rank deficient in this case, with a zero eigenvalue in the direction of the missing information. Therefore, although interpolation is still used to compute the elements of $B_i$, the reconstructed results do not depend on the interpolated samples which contain interpolation errors.

In the method described above, the views at low kVp and high kVp are well correlated temporally in that almost the same ray at both energies passes through the patient at almost the same angle. More specifically, when a material decomposition is performed, it is optimally desirable that the exact same ray is measured at both low energy and at high energy. However, in operation, the same ray at two different energies does not occur because the x-ray source is rotating. Therefore, a single ray at low energy and a different single ray at high energy are acquired with the rays not being exactly aligned. Accordingly, when a material decomposition is performed, the statistical weighting components are estimated in the form of the matrix B, for each measurement pair of index i. In fast kVp switching this results in a 2×2 B matrix having two materials and two energies. However, in various embodiments, one of the eigenvalues of the B matrix is zero, and referred to herein as a rank 1 matrix or a rank deficient matrix, which means that not all the measurements are available simultaneously at both energies. Note that because of numerical precision or other factors one of the eigenvalues may not be exactly zero, but close to zero nonetheless, which effectively amounts to reducing the contribution from the corresponding interpolated material decomposed sinogram element to the reconstructed images to substantially zero. Accordingly, in a joint reconstruction, a water image, for example, may include information representative of both the water projections and, for example, the iodine projections. However, in fast kVp switching acquisition mode, depending on which measurement is missing at each instant, i.e. the low energy or the high energy measurement, one of the eigenvalues of the joint statistical matrix for the material decomposed sinograms is going to be zero, but the proposed reconstruction technique is still capable of generating an improved quality image.

In various embodiments, the methods described herein may be utilized to perform joint prior modeling. For example, as described above, the regularization term typically takes the form of a local spatial penalty in S(x). In various embodiments described herein, modeling of the joint prior in the K-dimensional material decomposition space may be performed. More specifically, the material basis is represented as the combination of L component materials where L≥K. The model may then be used to jointly estimate the K basis materials within L possible materials for the reconstruction along with the material density images in order to improve on the original material decomposition.

For example, for a voxel i, and K=2:

$$x_i=[x_{i,2},x_{i,2}]=[z_{i,1},\ldots,z_{i,l}]M=z_iM.$$

where $z_i \in \mathfrak{R}^{1 \times L}$ is the vector of reconstructed image densities in the L-dimensional space of possible materials, and M∈ $\mathfrak{R}^{L \times 2}$ is the material mixing matrix. Therefore, for the case of an entire image:

$$x=zM$$

where $x \in \mathfrak{R}^{N/K}$, $z \in \mathfrak{R}^{N/L}$ and $M \in \mathfrak{R}^{L/K}$. The rows of M then have the interpretation of being the absorption response of each of the L materials as represented in the K-dimensional basis system.

Using the above representation, the MBIR cost function may then be stated as:

$$\hat{z} = \underset{z}{\operatorname{argmin}}\{D(\hat{p}; zM) + S(z)\}$$

where the stabilizing function may be written as:

$$S(z) = \sum_{l=1}^{L} \sum_{[s,r] \in C} w_{s,r,l}\rho(z_{s,l} - z_{r,l}) \qquad \text{Equation 7}$$

The coefficients $\omega_{s,r,l}$ represent different weighting factors for each of the (s, r, l) combinations within the local neighborhood in C over L dimensions. The potential functions, $\rho(\Delta)$, may be used to enforce sparsity in the mixture of distinct materials present in each voxel. Additionally, the material mixing matrix, M, may be adapted to represent the material composition of different reconstructions or different scanned objects.

As described above, the D term in Equation 1 relates the data to the image. Additionally, S(x) which is an image-based term, is used to enforce constraints on the image regarding the type of image that is most likely to represent the desired solution. In various embodiments, S(x) may also be referred to herein as a regularization term, a prior term, or a prior distribution term. In operation, S(x) may therefore be utilized to perform MBIR, or regularized iterative reconstruction in general. More specifically, if an independent reconstruction of the two separate material datasets is performed, there is an S(x) term for each material. However, in various embodiments described herein, when a joint reconstruction is performed S(x) becomes more than S(water) and S(iodine), which may be formulated to take advantage of correlation information between the two material images.

As discussed above, dual energy reconstruction may be utilized to reconstruct an image of water and an image of iodine. However, the data acquired during acquisition is an estimate of water and an estimate of iodine derived from the two x-ray spectra acquired during acquisition. Accordingly, the methods described herein focus on which material is currently being reconstructed. For example, the S(x) term or the regularization function may not be written solely in terms of iodine and water, but may also include additional components or materials, such as for example, calcium which is a component of bone or soft tissue, or a mixture thereof.

Accordingly, in various embodiments, the regularization function S(x) may be written as a function that represents a mixture of water, iodine, soft tissue, and/or bone, such that regularization function S(x) may be utilized for reconstruction using more information than is included in the data 60 acquired during the acquisition. The joint prior modeling technique described herein may be performed iteratively to estimate the water, the iodine, and other components not being reconstructed.

In various embodiments, the joint prior modeling is performed during reconstruction and provides information indicating which material provides the best separation between two material images that are desired to be reconstructed. More specifically, when material decomposition is performed in the projection domain before reconstruction, this decomposition is imperfect. As a result, if the reconstruction is performed using these imperfect datasets, the resultant image may include both water and iodine, i.e. the water image may include a small amount of iodine and the iodine image may include a small amount of water. However, using the joint reconstruction method described herein an image may be reconstructed using over-complete basis functions, i.e. basis functions that include two or more materials.

In various embodiments, the methods described herein may be utilized to in conjunction with a non-negativity constraint. Statistical iterative reconstruction may use constraints, such as the non-negativity constraint, to limit the solution to a desired solution space. In operation, physics of the imaging system utilized to acquire the data requires that reconstructed image densities may not be less than the density of air, which leads to enforcing a non-negativity constraint in the iterative loop. For multi-spectral images, however, it is not desirable to enforce this constraint in the individual material component densities. Instead, material densities are reconstructed relative to the chosen material basis pair which may be negative in that space. Accordingly, it may be difficult to determine the valid domain to enforce the physical constraint in the material component densities. However, the constraint may be applied more easily in the domain of the approximately monochromatic attenuation images created from the linear combination of the reconstructed image component densities from the multi-spectral data. Therefore, the non-negativity constraint described herein for various embodiments results in improved and easier reconstruction of the individual physical components.

More specifically, a non-trivial constraint may be utilized based on the physical knowledge that the linear attenuation coefficients of any real material should be non-negative at any photon energy in the approximately monochromatic imaging domain.

For example, for all $E \in [40, 140]keV^1$, the linear attenuation coefficient $\mu_1(E)$ of any material as a function of energy is:

$$\mu_{1j}(E) \cdot x_j \cdot \mu^T(E) \geq 0. \quad \text{Equation 8}$$

where $x_j = [x_{j,1}, x_{j,2}]$ are the material densities at voxel j for materials k=1 and k=2, and $\mu(E) = [\mu_1(E), \mu_2(E)]$ represent the mass attenuation coefficients for materials k=1 and k=2 as a function of energy. This constraint is then equivalent to the constraint that:

$$x_j \cdot n^T(E) \geq 0. \quad \text{Equation 9}$$

Where $$n(E) = \frac{\mu(E)}{\|\mu(E)\|}$$

is the normalized mass attenuation vector. The constraint set is then given by $x_j \in \Omega$ where:

$$\Omega = \cap_{E \in [40,140]} \{x_j \in \mathfrak{R} : x_j \cdot n_T(E) \geq 0\}. \quad \text{Equation 10}$$

Therefore, $\Omega$ is formed by the intersection of an infinite number of half planes for each energy level. So, as expressed in Equation 10, the non-negativity constraint in the monochromatic domains translates to an infinite number of constraints, which is not tractable for practical use. However, the form of $\Omega$ may be simplified by identifying that the direction of n(E) is moving continuously with E. Therefore, the constraint may be represented more simply by the intersection of two half planes corresponding to the minimum and maximum values of n(E) as $n_{min}$ and $n_{max}$, with:

$$\Omega\{x: x_j \cdot n_{min}^T \geq 0 \text{ and } x_j \cdot n_{max}^T \geq 0\}. \quad \text{Equation 11}$$

For example, when material images of water and iodine are reconstructed, the resultant density image may not include negative densities. However, because the data may include noise, the reconstruction may converge towards negative values. Moreover, in dual energy imaging the material images are not attenuation density images. Accordingly, negative values are acceptable in material images. However, it is desirable to ensure that the final material density image, i.e. the monochromatic image, formed from the combination of material decomposition images is strictly positive. Accordingly, as the reconstruction of the material images is performed, the combination of the material images into a monochromatic image is considered. More specifically, a relationship between the two material images is considered and a non-negativity constraint on the equivalent monochromatic image that would be created from the two material images that are in the process of being estimated is considered.

More generally, the density, or linear attenuation coefficient, of an image voxel is some linear combination of the different elements we are reconstructing. Therefore, as noted above in Equation 8, $\mu_{1j}$, which is strictly non-negative across all energy E, is the material density image that corresponds to a monochromatic image that is formed from the projection images $x_{j,1}$ of water and $x_{j,2}$ of iodine multiplied by the linear attenuation coefficient of either water or iodine which is the $\mu^T(E)$ on the right hand side of Equation 8 and the linear combination of the two provides the monochromatic image.

Figure 3:
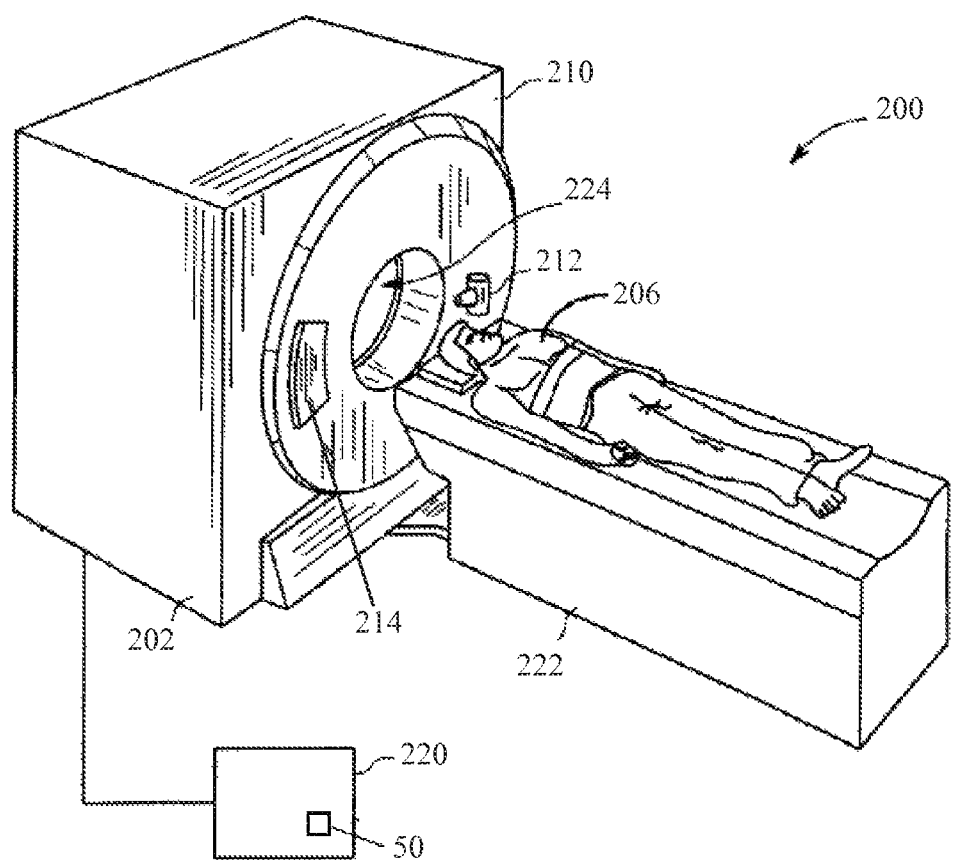
FIG. 3 is a pictorial view of an imaging system formed in accordance with various embodiments.
Figure 4:
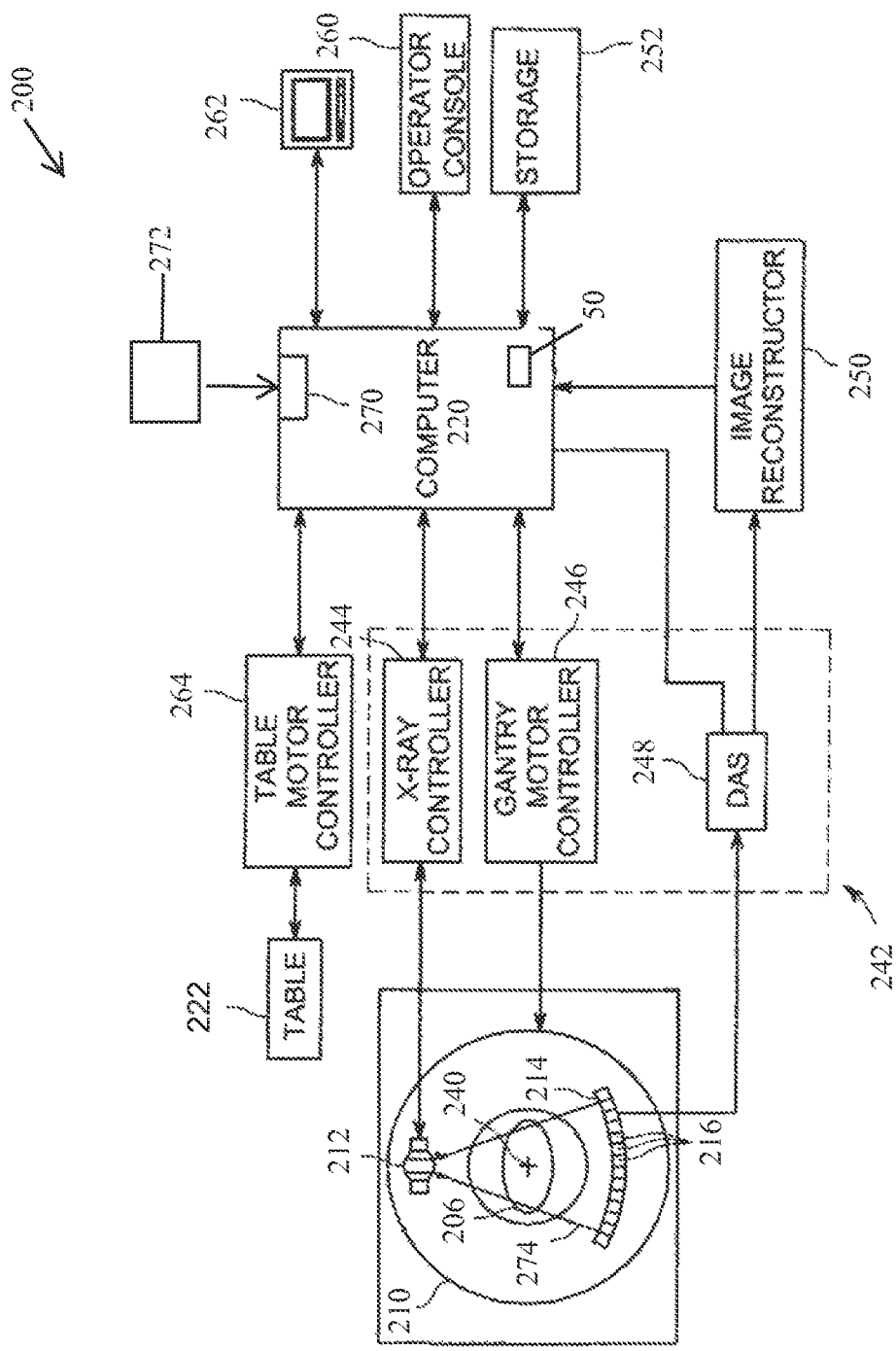
FIG. 4 is a block schematic diagram of the system illustrated in FIG. 3.

The various methods described herein may be implemented using a medical imaging system. For example, FIG. 3 is a pictorial view of a computed tomography (CT) imaging system 200 that is formed in accordance with various embodiments. FIG. 4 is a block schematic diagram of a portion of the CT imaging system 200 shown in FIG. 3. Although the CT imaging system 200 is illustrated as a standalone imaging system, it should be realized that the CT imaging system 200 may form part of a multi-modality imaging system. For example, the multi-modality imaging system may include the CT imaging system and a positron emission tomography (PET) imaging system, or a single photon emission computed tomography (SPECT) imaging system. It should also be understood that other imaging systems capable of performing the functions described herein are contemplated as being used.

The CT imaging system 200 includes a gantry 210 that has an X-ray source 212 that projects a beam of X-rays toward a detector array 214 on the opposite side of the gantry 210. The detector array 214 includes a plurality of detector elements 216 that are arranged in rows and channels that together sense the projected X-rays that pass through an object, such as the subject 206. The imaging system 200 also includes a computer 220 that receives the projection data from the detector array 214 and processes the projection data to reconstruct an image of the subject 206. In operation, operator supplied commands and parameters are used by the computer 220 to provide control signals and information to reposition a motorized table 222. More specifically, the motorized table 222 is utilized to move the subject 206 into and out of the gantry 210. Particularly, the table 222 moves at least a portion of the subject 206 through a gantry opening 224 that extends through the gantry 210.

As discussed above, the detector 214 includes a plurality of detector elements 216. Each detector element 216 produces an electrical signal, or output, that represents the intensity of an impinging X-ray beam and hence allows estimation of the attenuation of the beam as it passes through the subject 206. During a scan to acquire the X-ray projection data, the gantry 210 and the components mounted thereon rotate about a center of rotation 240. FIG. 2 shows only a single row of detector elements 216 (i.e., a detector row). However, the multislice detector array 214 includes a plurality of parallel detector rows of detector elements 216 such that projection data corresponding to a plurality of slices can be acquired simultaneously during a scan.

Rotation of the gantry 210 and the operation of the X-ray source 212 are governed by a control mechanism 242. The control mechanism 242 includes an X-ray controller 244 that provides power and timing signals to the X-ray source 212 and a gantry motor controller 246 that controls the rotational speed and position of the gantry 210. A data acquisition system (DAS) 248 in the control mechanism 242 samples analog data from detector elements 216 and converts the data to digital signals for subsequent processing. For example, the subsequent processing may include utilizing the module 50 to implement the various methods described herein. An image reconstructor 250 receives the sampled and digitized X-ray data from the DAS 248 and performs high-speed image reconstruction. The reconstructed images are input to the computer 220 that stores the image in a storage device 252. Optionally, the computer 220 may receive the sampled and digitized X-ray data from the DAS 248 and perform various methods described herein using the module 50. The computer 220 also receives commands and scanning parameters from an operator via a console 260 that has a keyboard. An associated visual display unit 262 allows the operator to observe the reconstructed image and other data from computer.

The operator supplied commands and parameters are used by the computer 220 to provide control signals and information to the DAS 248, the X-ray controller 244 and the gantry motor controller 246. In addition, the computer 220 operates a table motor controller 264 that controls the motorized table 222 to position the subject 206 in the gantry 210. Particularly, the table 222 moves at least a portion of the subject 206 through the gantry opening 224 as shown in FIG. 3.

Referring again to FIG. 4, in one embodiment, the computer 220 includes a device 270, for example, a floppy disk drive, CD-ROM drive, DVD drive, magnetic optical disk (MOD) device, or any other digital device including a network connecting device such as an Ethernet device for reading instructions and/or data from a tangible non-transitory computer-readable medium 272, that excludes signals, such as a floppy disk, a CD-ROM, a DVD or an other digital source such as a network or the Internet, as well as yet to be developed digital means. In another embodiment, the computer 220 executes instructions stored in firmware (not shown). The computer 220 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

In the exemplary embodiment, the X-ray source 212 and the detector array 214 are rotated with the gantry 210 within the imaging plane and around the subject 206 to be imaged such that the angle at which an X-ray beam 274 intersects the subject 206 constantly changes. A group of X-ray attenuation measurements, i.e., projection data, from the detector array 214 at one gantry angle is referred to as a "view". A "scan" of the subject 206 comprises a set of views made at different gantry angles, or view angles, during one revolution of the X-ray source 212 and the detector 214. In a CT scan, the projection data is processed to reconstruct an image that corresponds to a three-dimensional volume taken in the subject 206.

Exemplary embodiments of a multi-modality imaging system are described above in detail. The multi-modality imaging system components illustrated are not limited to the specific embodiments described herein, but rather, components of each multi-modality imaging system may be utilized independently and separately from other components described herein. For example, the multi-modality imaging system components described above may also be used in combination with other imaging systems.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc., are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for reconstructing image component densities of an object, said method comprising:
   acquiring multi-spectral x-ray tomographic data;
   performing a material decomposition of the multi-spectral x-ray tomographic data to generate a plurality of material decomposed sinograms; and
   reconstructing a plurality of material component density images by iteratively optimizing a single functional that includes a joint likelihood term of at least two of the material decomposed sinograms given a material component density reconstruction, wherein the joint likelihood term includes correlation information between the material decomposed sinograms.

2. The method of claim 1, wherein the joint likelihood term includes a plurality of statistical weighting matrices $B_i$ in the material sinograms, the statistical weighting matrices $B_i$ including at least one non-zero off diagonal coefficient.

3. The method of claim 1, wherein the joint likelihood term includes a plurality of statistical weighting matrices $B_i$, the statistical weighting matrices $B_i$ having at least one eigenvalue substantially zero.

4. The method of claim 1, wherein the joint likelihood term includes a plurality of statistical weighting matrices $B_i$, at least two of the statistical weighting matrices $B_i$ differing from point to point in the sinogram.

5. The method of claim 1, wherein the joint likelihood term includes a plurality of statistical weighting matrices $B_i$, at least two of the statistical weighting matrices $B_i$ varying in a temporal direction.

6. The method of claim 1, further comprising acquiring the multi-spectral x-ray tomographic data using a fast peak kilo-voltage (kVp) switching acquisition mode.

7. The method of claim 6, wherein the material component density images do not depend substantially on interpolated missing samples generated during the material decomposition.

8. The method of claim 1, further comprising performing the material decomposition in sinogram space using a nonlinear transformation that includes a plurality of coefficients, the coefficients being estimated during a calibration procedure.

9. The method of claim 8, wherein the coefficients of the nonlinear transformation are iteratively updated.

10. The method of claim 1, wherein the functional includes a regularization term in the material component density images.

11. The method of claim 10, wherein the functional includes a local spatial penalty in the material component density images.

12. The method of claim 10, wherein the regularization term includes a joint penalty between the material component density images.

13. The method of claim 12, wherein a plurality of material basis vectors used to generate the material component density images are not known prior to reconstructing the material component density images.

14. The method of claim 12, wherein a plurality of material basis vectors are used to generate the material component density images, the parameters being estimated concurrently with during the image reconstruction.

15. The method of claim 1, wherein the reconstructed image densities are constrained such that a linear combination of reconstructed image component densities corresponding to the material decomposition is only non-negative.

16. The method of claim 15, wherein the constraint is when:
   a dot product of the reconstructed image material densities and a minimum mass attenuation coefficient vector for the reconstructed imager material components in an energy range for reconstruction is negative; and
   the dot product of the reconstructed image material densities and a maximum mass attenuation coefficient vector for the reconstructed imager material components in the energy range for reconstruction is non-negative.

17. The method of claim 1, wherein the multi-spectral x-ray tomographic data includes data acquired at two different energies.

18. The method of claim 1, wherein the multi-spectral x-ray tomographic data is acquired using a photon counting tomographic system.

19. The method of claim 1, wherein the material component density images represent more than two materials.

20. An x-ray tomography imaging system comprising:
   a processor programmed to:
   acquire multi-spectral x-ray tomographic data;
   perform a material decomposition of the multi-spectral x-ray tomographic data to generate a plurality of material discomposed sinograms; and
   reconstruct a plurality of material component density images by iteratively optimizing a single functional that includes a joint likelihood term of at least two of the material decomposed sinograms given a material component density reconstruction, wherein the joint likelihood term includes correlation information between the material sinograms.

21. A non-transitory computer readable medium programmed to instruct a processor to:
   acquire multi-spectral x-ray tomographic data;
   perform a material decomposition of the multi-spectral x-ray tomographic data to generate a plurality of material decomposed sinograms; and
   reconstruct a plurality of material component density images by iteratively optimizing a single functional that includes a joint likelihood term of at least two of the material decomposed sinograms given a material component density reconstruction, wherein the joint likelihood term includes correlation information between the material decomposed sinograms.

* * * * *